Aug. 30, 1960  K. L. HERTEL  2,950,784
INSTRUMENT DAMPING DEVICES
Filed Sept. 23, 1955  4 Sheets-Sheet 1
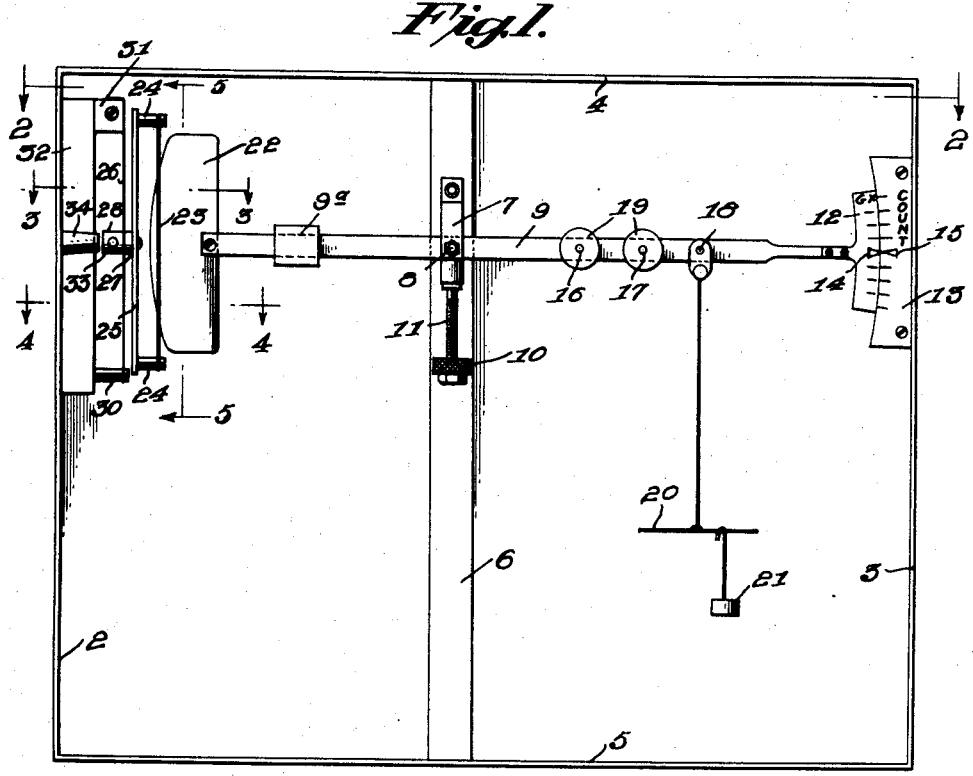
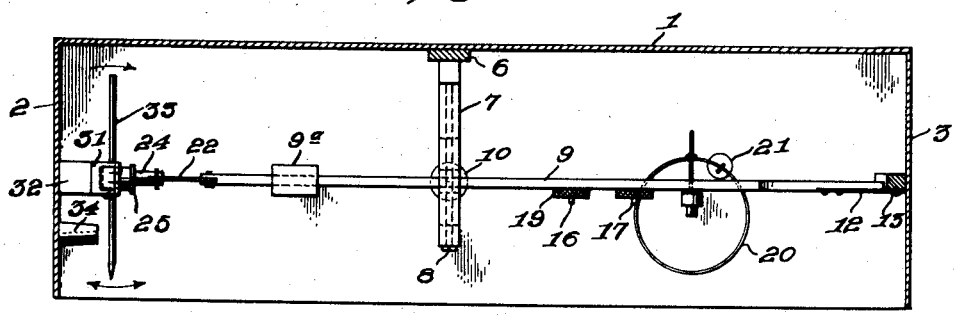
INVENTOR
Kenneth L. Hertel
BY Stone, Boyden & Mack,
ATTORNEYS Aug. 30, 1960 K. L. HERTEL 2,950,784
INSTRUMENT DAMPING DEVICES
Filed Sept. 23, 1955 4 Sheets-Sheet 2

INVENTOR
Kenneth L. Hertel

BY Stone, Boyden & Mack,

ATTORNEYS

Aug. 30, 1960 K. L. HERTEL 2,950,784
INSTRUMENT DAMPING DEVICES
Filed Sept. 23, 1955 4 Sheets-Sheet 3
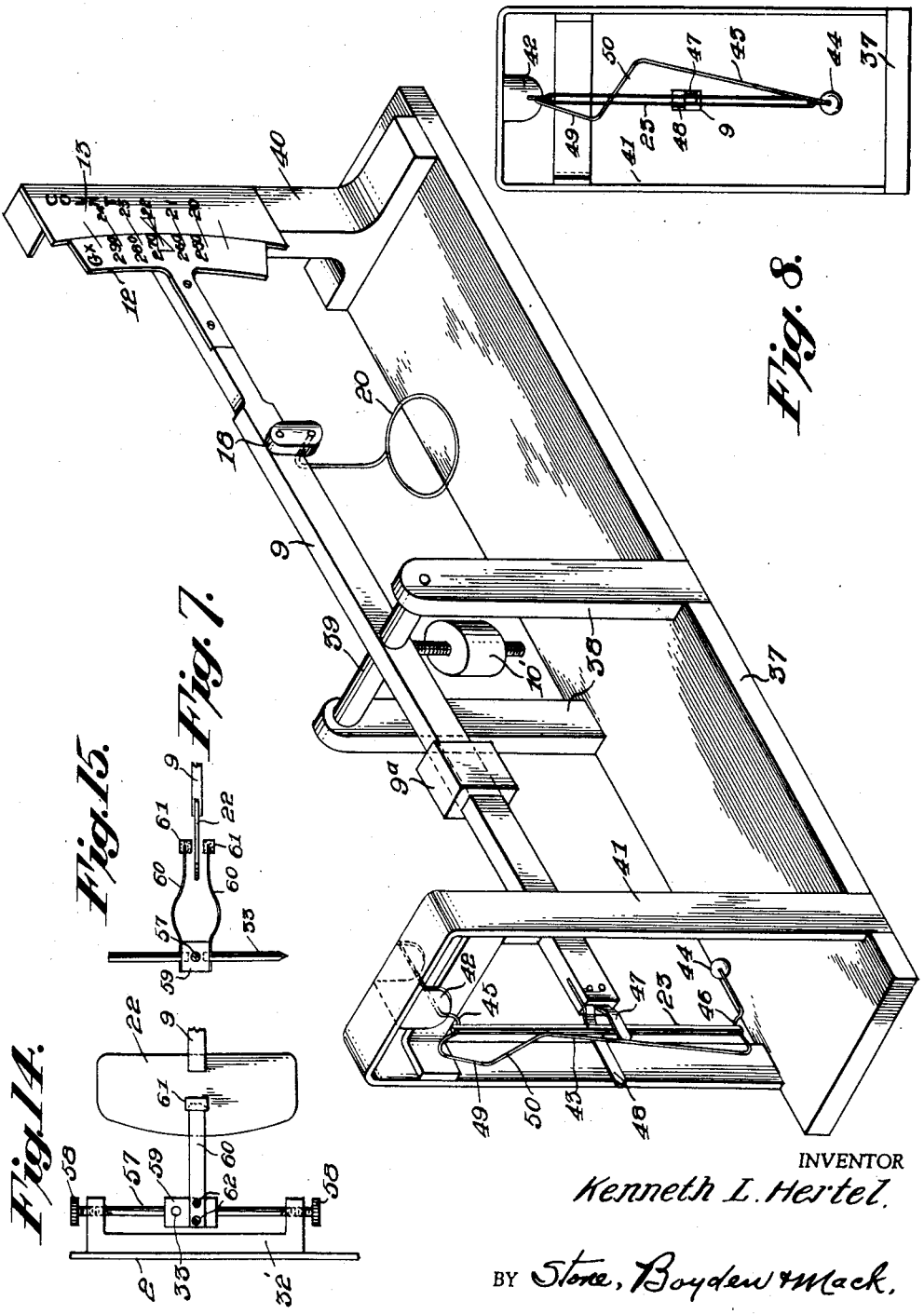
INVENTOR
Kenneth L. Hertel
BY Stone, Boyden & Mack,
ATTORNEYS

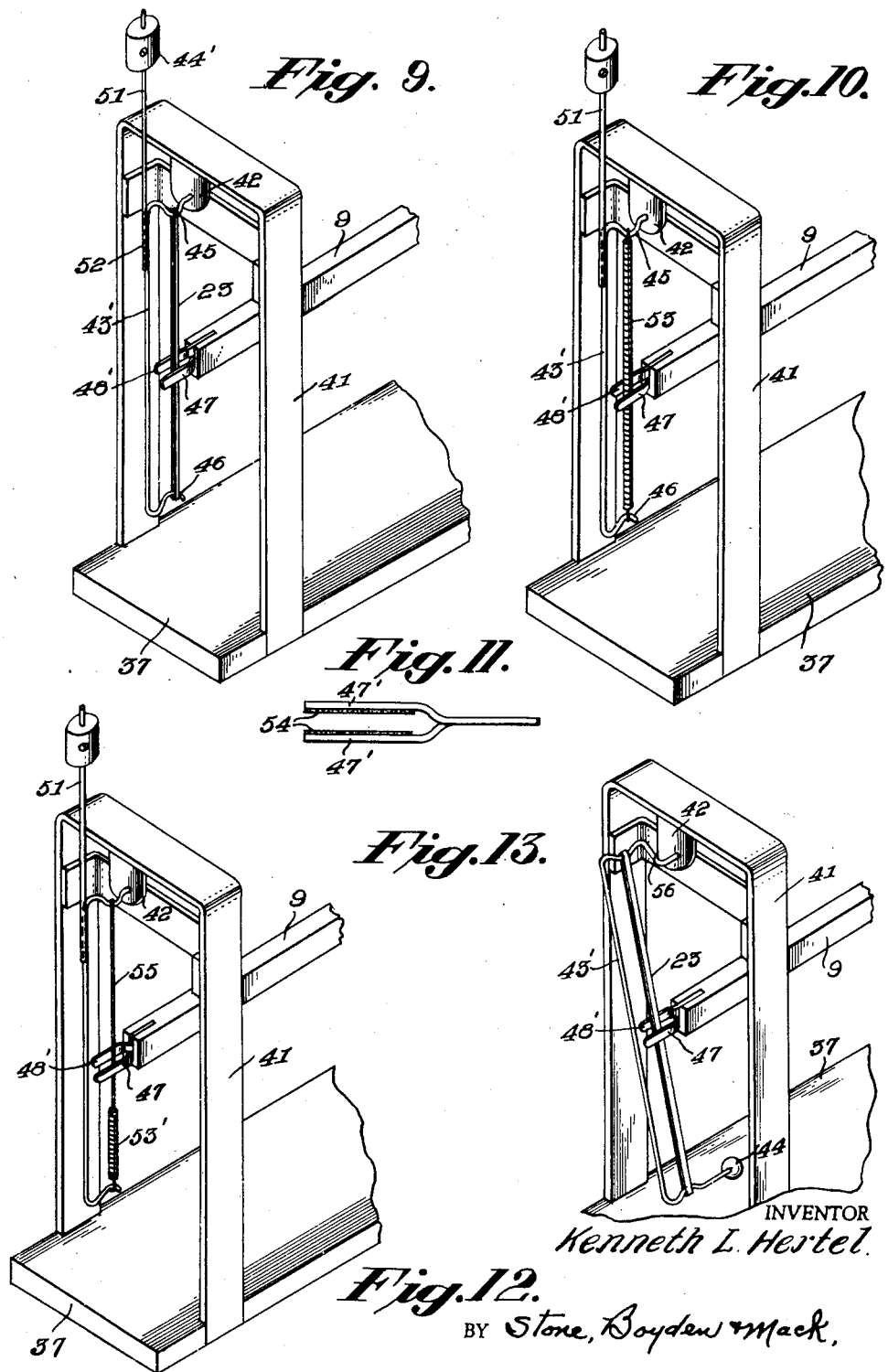

United States Patent Office 2,950,784
Patented Aug. 30, 1960

2,950,784
INSTRUMENT DAMPING DEVICES

Kenneth L. Hertel, Knoxville, Tenn., assignor to University of Tennessee Research Corporation, Knoxville, Tenn., a corporation of Tennessee Filed Sept. 23, 1955, Ser. No. 536,233

16 Claims. (Cl. 188—85)

This invention relates to damping devices for indicating instruments, and more particularly for instruments having a swinging or oscillating member as a part of their mechanism.

As is well known, in delicate measuring instruments such, for example, as scales or balances having a pivoted beam, such beam will frequently oscillate for a long period of time before coming to rest at the proper point. This renders the operation of such balances slow and tedious, and causes loss of much time, especially where it is desired to use the instrument for making a series of determinations or tests, one after the other in rapid succession, and where it is thus important to be able to ascertain the final indication quickly.

The general object of the present invention is, therefore, to provide an improved damping or braking device which will cause the oscillating or swinging member of such an instrument to reach its final position almost immediately, after each actuation.

A further object is to devise damping means of this nature which will produce the desired result without interfering in the least with the delicacy or accuracy of such instruments.

I achieve these objects by employing what I shall designate as the "On-Off" principle of operation. Instead of applying a continuous drag or retarding force to the moving or oscillating member of the instrument, I apply a frictional drag intermittently to the moving member in such manner that the retarding force acts momentarily for an instant, and then the member is entirely free to move during the next instant, and this action is repeated periodically until the moving member comes to rest. In other words, the drag or retarding force is alternately "on" and "off" at rapidly recurring intervals.

In order that the invention may be readily understood, reference is had to the accompanying drawings forming part of this specification, and illustrating several different embodiments of the invention, in which drawings:

Fig. 1 is a front elevation of one form of an improved yarn sizing balance to which one form of my improved damping device is applied.

Fig. 2 is a horizontal section substantially on the line 2—2 of Fig. 1.

Fig. 3 is a horizontal section on an enlarged scale substantially on the line 3—3 of Fig. 1, parts being omitted for the sake of clearness.

Fig. 7 is a perspective view of a yarn sizing balance equipped with another form of damping device.

Fig. 8 is a front elevation of the damping device shown in Fig. 7.

Figs. 9, 10, 12 and 13 are fragmentary perspective views similar to Fig. 7 but showing slightly modified constructions of the damping device;

Fig. 11 is a fragmentary plan view on an enlarged scale showing one of the parts of the damping device illustrated in Fig. 10.

Fig. 14 is a fragmentary side elevation of still another form of my improved damping device; and Fig. 15 is a plan view of the parts shown in Fig. 14, the supporting bracket being omitted for the sake of clearness.

Figure 5:
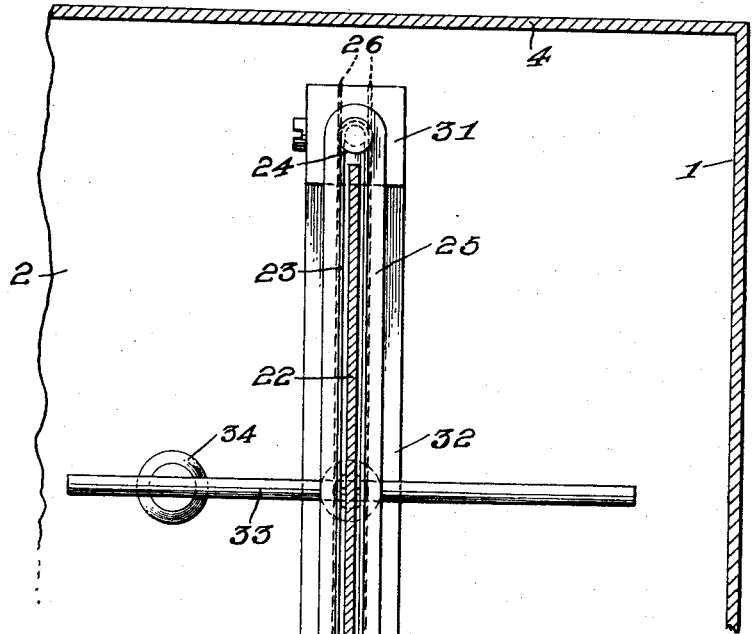
Fig. 5 is a vertical section on a greatly enlarged scale substantially on the line 5—5 of Fig. 1.

Referring to the drawings in detail and more particularly first to Figs. 1 to 5 and 7, the balance illustrated in Figs. 1 to 5 is shown as enclosed in a suitable case or cabinet having a back wall 1, side walls 2 and 3, a top wall 4 and a bottom 5.

Secured to the back wall is a vertical strip 6 to which is attached a supporting bracket 7. In this bracket is mounted on a pivot 8 the scale beam 9. Preferably depending from this beam adjacent the pivot is a weight 10 vertically adjustable on a threaded bolt 11.

To the right hand end of the beam 9 is secured a movable scale 12 having an arcuate edge adapted to cooperate with a complementary edge of a fixed scale 13 mounted on the cabinet. These scales have arrowheads or the like 14, 15 formed on them at about the center of each, and these arrowheads coincide at times, as hereinafter described.

Set into the beam 9 at the right hand side of the pivot 8 are three pins 16, 17 and 18. Two disc shaped weights 19 are provided, having holes adapted to fit over these pins, and there is also a pan, in the nature of a wire loop 20, which may be suspended from any one of the three pins above mentioned.

A series of three additional weights such as 21 are also provided and these are constructed with hooks adapted to engage over the loop 20, at times, as shown in Fig. 1. It will be understood that the particular weight illustrated in Fig. 1 is the smallest of the three and that the other two are one and a third as large and twice as large, respectively.

As best shown in Fig. 7 the scale 12 is graduated in units called "Grex," while the scale 13 is graduated in what is called "Counts," these units being used to designate the size of threads or yarns.

The count numbers which are shown as running from 20 to 24 increase as the size of the yarn decreases. Thus a yarn having a count of "23" is smaller than a yarn having a count of "21." To use a similar example based on the labeling of spool cotton, No. 60 thread is much smaller than a No. 30 thread.

The Grex numbers, on the other hand increase with the size of the yarn, so that the two scales are reciprocally related. If one wishes to read the size of a yarn in Grex he reads the movable scale against the fixed arrowhead. If however he wishes to read the size of a yarn in counts he reads the fixed scale against the movable arrowhead. It will be noted that the two reciprocal scales are both graduated with their small readings at one end and their largest readings at the other.

The Grex is a unit for expressing the weight of a yarn per unit length. The figures appearing on the scale designate grams per 10,000 meters. If one had 10,000 meters of a 22's yarn the Grex number would be around 270, and this number corresponds with "22" on the count scale, as will be seen from an inspection of Fig. 7.

In determining the size of a yarn by means of my improved balance it is standard practice to select either 30, 40 or 60 specimens of the same yarn, these specimens being wadded together to give a cohesive mass which may then be placed on or in the wire loop 20. If a bunch of 30 specimens is to be weighed the wire loop is hung from the pin 18 as shown in Fig. 1 while the two weights 19 are placed upon the other two pins.

If on the other hand a bunch of 40 specimens are to be weighed the loop 20 is placed upon the middle pin 17, and one of the weights 19 is placed on the pin 18. Finally if a bunch comprising 60 specimens is to be weighed, the wire loop 20 is hung on the pin 16 and the two weights 19 are placed on the other two pins. It will be understood that the wire loop and its hanger is equal in weight to each of the weights 19, so that when the scale is unloaded as shown in Fig. 1, it makes no difference on which of the pins the loop and the weights are placed since the aggregate effect of all three on the beam is the same. It will also be understood that each of the specimens above referred to is made up of the same length of yarn so that a bunch comprising 60 specimens is approximately twice as heavy as a bunch comprising 30 specimens.

The three weights 21 are respectively equal to bunches of yarn of a definite size, as for example, 22's yarn, comprising 30, 40 and 60 specimens, and the appropriate one of these weights may be used from time to time to check the scale for accuracy, by substituting the weight for a bunch of yarn, so as to bring the arrowheads into co-incidence.

My improved damping device hereinafter described is shown as applied to a yarn sizing balance of this type, for purposes of illustration.

However, this yarn sizing balance forms no part of the present invention. No attempt is made to claim the construction of this balance in the present case, but this subject matter is reserved to form the basis of a divisional application.

Coming now to the damping device itself and referring again particularly to Figs. 1 to 5, it will be seen that at the left hand end of the beam 9 is rigidly mounted a thin flat vane 22. This is so arranged as to pass freely between two parallel spaced portions of a resilient flexible strand element 23 held on a suitable support. In practice it has been found that an ordinary rubber band serves satisfactorily as such an element and in the drawing this band is shown as held under tension between two pins 24 carried at opposite ends of a vertically disposed supporting strip 25. This supporting strip in turn is itself resiliently supported on a pair of taut wires 26. These wires are clamped between a pair cylindrical members 27 and 28, by means of a screw 29 passing through these members and through the strip 25, as best shown in Fig. 3.

The wires 26 are stretched between a pin 30 at one end, and a block at the other end 31, these being mounted on a fixed block 32, secured to the side wall 2 of the cabinet. It will be seen that these taut wires constitute a bi-filar suspension for the strip 25 and flexible element 23, and a bar 33 passes through and is secured to the member 28. This bar has substantial momentum, so that by displacing it laterally with the finger and releasing it, the strip 25 and flexible resilient strand element 23 are thrown into rapid vibration in a direction transverse to the plane of oscillation of the beam 9 and vane 22. A stop or bumper 34 may be provided to limit the amplitude of this vibration.

From the foregoing it will be seen that the damping device consists of a pair of cooperating braking elements carried by the vibrating means and by the oscillating beam respectively. When the beam is oscillating, if the strip 25 and flexible strand element 23 are set into vibration by means of the bar 33, each of the single resilient portions of the strand element 23 will be caused to momentarily and alternately frictionally engage the two outside opposite surface portions or flat faces of the vane element 22. At the instant that the strand element engages one of these surfaces it will act as a friction brake to retard the movement of the vane 22, and the next instant, when it moves out of contact with the surface of the vane, the vane and beam will be entirely free to move. Thus the retarding action is applied and released momentarily and alternately, thus producing what I call an "On-Off" action. It will be further understood that the application of the retarding force is repeated periodically as the strand element vibrates, and ordinarily, due to the momentum of the vibratory means co-operating with the resilient means 23, the vibration will continue until after the moving vane and beam have been brought completely to rest at their final position. The resilient means 23 thus serves to assist the bifilar suspension in maintaining the vibration.

By virtue of the "On-Off" action above described it will be appreciated that the freedom of movement of the vane and beam is not interfered with, and that accuracy of the balance is not impaired. This is due to the fact that after each momentary retarding action the vane and beam are perfectly free to move.

Figure 6:
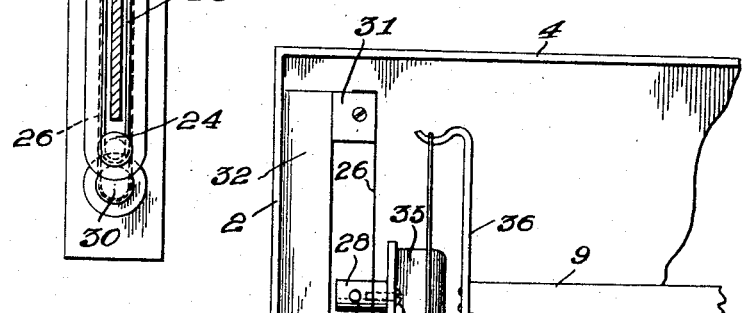
Fig. 6 is a fragmentary front elevation on an enlarged scale illustrating the upper left hand corner of Fig. 1, but showing a modified construction.
Figure 4:
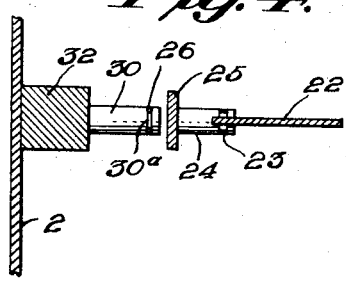
Fig. 4 is a similar transverse section on the line 4—4 of Fig. 1.

In Fig. 6 I have illustrated an obvious modification of the damping or braking device above described, in which the resilient strand element 23 is supported by a yoke 36 carried by the beam 9, thus forming a portion of the oscillating member, and straddles a vane element 35 which forms a portion of the vibrating means. The action is precisely the same, whether the strand element or the vane vibrates. In either case the strand is brought momentarily into frictional contact alternately with the opposed side surfaces of the vane, and the movement of the beam 9 is thus damped.

In Figs. 7 and 8 I have illustrated another form of damping device shown in connection with a yarn sizing balance of somewhat different construction.

In these figures a base 37 supports a pair of columns 38 carrying a pivot pin 39 on which the beam 9 is mounted. The scale 13 is carried by a post 40 mounted on the base, and for the sake of simplicity, only a single pin 18 for supporting the wire loop 20 is shown.

At the forward end of the base 37 is an inverted U-shaped supporting structure 41, carrying at its upper end a bearing 42 in which is journaled a horizontal portion of a momentum device in the nature of a pendulum 43, carrying at its lower end a bob 44. This pendulum is adapted to swing in a vertical plane about the horizontal portion mounted in the bearing 42.

Adjacent the bearing is a downwardly bent portion 45, and at the lower end of the pendulum is a similar upwardly bent portion 46, and between these two bent portions is secured an ordinary rubber band 23, similar to that described in connection with Figs. 1 to 6.

Projecting forwardly from the end of the beam 9 is a fork comprising a relatively short member 47 and a relatively long member 48, these two members presenting on their inner sides opposed surface portions, and being spaced apart laterally in parallel relation, so as to straddle the rubber band or strand element 23.

Near its upper end the pendulum is formed with an offset portion 49 which merges with a downwardly inclined cam portion 50.

As shown in Fig. 8 this pendulum normally hangs in a substantially vertical position with the rubber band 23 lying substantially in the plane of oscillation of the beam 9 between the fork members 47 and 48. The short member 47 of the fork is long enough to engage the band 23 but does not extend outwardly far enough to engage the pendulum 43. In other words it is clear of this pendulum. The long member 48 of the fork however extends out beyond the pendulum, as shown in Fig. 7. When therefore the beam oscillates this long arm 48 strikes the cam portion 50 of the pendulum and thus deflects the pendulum laterally, throwing it into vibration. As the pendulum swings or vibrates the rubber band 23 is brought momentarily and alternately into contact with the opposed surfaces of the forked member, thus damping or retarding the movement of the beam 9, in the same manner as described in connection with Figs. 1-5, and quickly bringing the beam to rest at the proper point.

As will be appreciated, the resilience of the rubber band serves to assist gravity in maintaining the vibration.

It will be seen that this form of device differs fundamentally from that shown in Figs. 1–6, in that, while in those figures the damping device has to be set into vibration manually, in Figs. 7 and 8 the pendulum, carrying the rubber band, is automatically set into vibration by the movement of the beam itself.

In Fig. 7 the balance is shown as provided with a weight 9a slidably adjustable on the beam 9, as in Figs. 1–5, and also with a counter weight 10' depending from the beam at the pivot and vertically adjustable on a threaded rod, in a manner similar to the weight 10 of Fig. 1.

In Fig. 9 I have illustrated a damping device similar in general to that shown in Fig. 7, but in which the bob is mounted at the upper end of the pendulum instead of at the lower end. In this figure I have shown a rod 51 welded to the pendulum 43' at 52 and carrying at its upper end a weight or bob 44'. In this figure also the arm 48' of the fork may be the same length as the arm 47, both of said arms clearing the pendulum.

Owing to the fact that the weight 44' is above the pivotal axis of the pendulum it is in unstable equilibrium and the band 23 thus tends to normally engage one or the other of the arms of the fork when the device is at rest. Consequently, as soon as the beam 9 begins to move the pendulum is set into vibration.

In Fig. 10 I have illustrated the use of a helical spring 53 in place of the rubber band 23. This constitutes a single resilient strand, instead of the double strand illustrated in the preceding figures. When such a spring is employed, it will be preferable to line the inner surfaces of the arms 47' of the fork with some non-metallic material 54, as indicated in Fig. 11, to provide a better frictional surface.

In Fig. 12 I have shown the flexible element as consisting of a single inextensible strand 55 held taut by means of a relatively short tension spring 53', this strand 55 engaging the opposed inner surfaces of the fork member as before.

In Fig. 13 I have illustrated a further modified arrangement of damping device in which the pendulum 43" does not hang vertically as in Fig. 8 but assumes an inclined position. This is due to the fact the pendulum is carried at the end of an arm 56 which offsets it laterally from the pivotal axis. As a result, the strand element lies lightly against one of the fork members when the device is at rest and this tends to prevent small oscillations of the beam. Such an action would have certain advantages. The damper would have the usual On-Off effect until the pendulum has lost all of its vibrational energy. After this, there is a slight continuous retarding effect which holds the beam in position. This may be desirable in some applications. An additional advantage is that with this arrangement it is not necessary to give the pendulum an initial start.

While I have shown, as a matter of convenience, the flexible strand element of Figs. 1 to 6, as in the nature of a continuous band, having the two parallel portions 23, it will, of course, be understood that it is wholly immaterial whether a continuous band is employed, or whether the two spaced portions 23 are separate strands.

Finally, in Figs. 14 and 15, I have shown still another form of the invention, utilizing the same "On-Off" principle. In these figures I have illustrated a vane 22 carried by the beam 9, as in Fig. 1. Instead of the resilient flexible strand element, however, I employ a braking device made up of a pair of flat steel springs. In the bracket 32', secured to the wall 2 of the cabinet, I mount a vertical shaft 57, by means of pivot bearings 58, and on this shaft I fasten a block or collar 59. A rod or bar 33, having substantial momentum, extends transversely through this block, as in Fig. 2. Secured to the opposite sides of the block 59, as by screws 62, are a pair of resilient, leaf springs 60, generally parallel but preferably bowed as shown, and having their free ends disposed one on each side of, but spaced slightly from, the vane 22. Friction pads 61, of soft material, are preferably mounted on the tips of the springs and adapted to engage the side surfaces of the vane.

When the bar 33 is displaced laterally with the finger, and released, as described in connection with Figs. 1 and 2, the block 59 and braking device comprising the springs 60 are thrown into rapid vibration, thus causing the friction pads 61 to alternately engage opposite sides of the vane. The resilience of the springs instead of the bifilar suspension of Figs. 1 and 2, co-operating with the momentum of the vibratory means, causes the vibration to be maintained for a considerable period of time, and the repeated momentary impact of the pads 61 on the vane serves to effectively damp its movement, and bring the beam quickly to rest, as before.

From the foregoing it will be seen that in all of the modifications the same general principle is employed, namely the principle of momentarily alternately retarding and releasing the beam. This is accomplished by periodically producing momentary frictional contact between a resilient element and the surface of a co-operating element, such periodic action being caused by a vibration of one of said elements in a direction transverse to the plane of oscillation of the beam.

What I claim is:

1. The combination with a supporting member, of a movable member mounted thereon to oscillate in a plane, a resilient, flexible strand element carried under tension by one of said members, and an element having a surface arranged adjacent said flexible strand element carried by the other of said members and means whereby one of said elements is mounted to vibrate relative to the other in a plane transverse to the plane of oscillation of said movable member so that said strand element and said surface are brought periodically into momentary frictional contact.

2. The combination with a supporting member, of a movable member mounted thereon to oscillate in a plane, a resilient, flexible strand element carried under tension by one of said members and comprising a pair of spaced parallel portions, and an element having a pair of opposed surface portions disposed adjacent said flexible strand element, carried by the other of said members, one of said elements extending between the said portions of the other element, and means whereby one of said elements is mounted to vibrate relative to the other in a plane transverse to the plane of oscillation of said movable member, so that said strand element is brought alternately and periodically into momentary frictional contact with the said opposed surface portions of the other element.

3. The combination with a supporting member, of a movable member mounted thereon to oscillate in a plane, a resilient, flexible strand element carried under tension by one of said members and comprising a pair of spaced parallel portions, and an element having a pair of opposed surfaces disposed between the pair of spaced, parallel, portions of said strand element, and carried by the other of said members, and means whereby one of said elements is mounted to vibrate relative to the other in a plane transverse to the plane of oscillation of said movable member, so that the parallel portions of said strand element are brought alternately into momentary frictional contact with the said opposed surfaces of the other said element.

4. The combination with a supporting member, of a movable member mounted thereon to oscillate in a plane, a resilient, flexible strand element carried under tension by one of said members and comprising a pair of spaced parallel portions, and a thin, flat vane element disposed between the spaced, parallel portions of said strand element and carried by the other of said members, and means whereby one of said elements is mounted to vibrate relative to the other in a plane transverse to the plane of oscillation of said movable member, so that the parallel portions of said strand element is brought alternately into momentary frictional contact with the opposite surfaces of said vane element.

5. The combination with a supporting member, of a movable member mounted to oscillate in a plane, a resilient, flexible strand element carried under tension by one of said members, and a fork element having a pair of spaced opposed surfaces disposed adjacent and one on each side of said flexible strand element carried by the other of said members, and means for vibrating one of said elements relative to the other in a plane transverse to the plane of oscillation of said movable member, so that said strand element is brought alternately into momentary frictional contact with the opposed surfaces of the said fork element.

6. The combination with a supporting member, of a movable member mounted thereon to oscillate in a plane, a resilient, flexible strand element carried under tension by one of said members and lying substantially in the plane of oscillation of said movable member, and an element having a surface arranged adjacent said flexible strand element carried by the other of said members, and means whereby one of said elements is mounted to vibrate relative to the other in a plane transverse to the plane of oscillation of said movable member, so that said strand element and said surface are brought intermittently into momentary frictional contact.

7. The combination with a movable member mounted to oscillate in a plane, and having a pair of spaced opposed surfaces, of a resilient, flexible strand, means for holding said strand under tension at a point adjacent and between said surfaces, and means for vibrating said strand transversely of the plane of oscillation of said movable member, so that said strand is brought into momentary frictional contact alternately with said spaced surfaces.

8. The combination with a movable member mounted to oscillate in a plane, and having a thin, flat portion, of a resilient, flexible strand comprising a pair of parallel, spaced portions, means for holding said strand under tension adjacent said movable member and in such position that said thin flat portion lies between the spaced portions of said strand, and means for vibrating said strand transversely of the plane of oscillation of said movable member, so that the two portions of said strand are brought into momentary frictional contact alternately with opposite sides of said thin, flat portion.

9. The combination with a movable member mounted to oscillate in a plane, and having a pair of spaced opposed surfaces, of a pendulum mounted to swing in a plane transverse to the plane of oscillation of said movable member, a resilient, flexible strand carried by said pendulum and held under tension thereon, said strand being positioned between said spaced, opposed surfaces, whereby, when said pendulum is vibrated, said strand is brought into momentary frictional contact alternately with said spaced, opposed surfaces.

10. The combination with a movable member mounted to oscillate in a plane, and having a pair of spaced opposed surfaces, of a pendulum mounted to swing in a plane transverse to the plane of oscillation of said movable member, a resilient, flexible strand carried by said pendulum and held under tension thereon, said strand being positioned between said spaced, opposed surfaces, and means operated by the oscillation of said movable member for causing said pendulum to vibrate so that said strand is brought into momentary frictional contact alternately with said spaced, opposed surfaces.

11. The combination with a supporting member, of a movable member pivotally mounted to oscillate in a plane, a pair of cooperating braking elements, one carried by one of said members and comprising a pair of spaced, generally parallel resilient portions, and the other element having a pair of opposed surfaces carried by the other of said members, said last mentioned element extending between said spaced portions of the other element, and means for vibrating one of said elements relative to the other in a plane transverse to the plane of oscillation of said movable member, so that the spaced resilient portions of said first mentioned braking element are brought alternately into momentary frictional contact with said opposed surfaces of the other element.

12. The combination with a movable member mounted to oscillate in a fixed plane, of means free at all times to vibrate in a direction transverse to said plane and including a resilient element arranged to periodically frictionally engage a portion of said member and apply thereto a series of momentary retarding forces, and means including said element for automatically maintaining the vibration for a substantial length of time.

13. Mechanism for damping the movement of a movable member mounted to oscillate in a plane comprising a supporting member, a pair of co-operating braking elements, one carried by one of said members and comprising a pair of spaced, generally parallel, resilient portions, and the other element carried by the other of said members and having a pair of opposed surfaces, said last mentioned element extending between said spaced portions of the first element, and means for vibrating one of said elements relative to the other in a plane transverse to the plane of oscillation of said movable member, so that the spaced resilient portions of said first-mentioned element are brought alternately into momentary frictional contact with said opposed surfaces of the other element.

14. The combination with a movable member mounted to oscillate in a fixed plane, of means having substantial momentum so supported that it is free to vibrate in a direction transverse to said plane, a pair of co-operating braking devices, one device forming a portion of said movable member and the other device forming a portion of said momentum means, one of said devices comprising an instrumentality having opposed surfaces, and the other comprising resilient means positioned to alternately engage such surfaces as said momentum means vibrates, the momentum of said vibratory means co-operating with said resilient means to automatically cause said vibratory means to continue to vibrate for a substantial length of time after it has once been set into vibration.

15. The combination with a movable member mounted to oscillate in a fixed plane and to rigidly resist lateral displacement, of means having substantial momentum and so supported that it is free at all times to vibrate in a direction transverse to said plane, said means including an element arranged to periodically and frictionally engage a portion of said member so as to apply thereto a series of momentary, laterally directed retarding forces as said means vibrates, the momentum of said vibratory means automatically causing said means to continue to vibrate for a substantial length of time after it has once been set into vibration.

16. The combination with a movable member mounted to oscillate in a fixed plane, of means having substantial momentum and so supported that it is free at all times to vibrate in a direction transverse to said plane, said means including a resilient element arranged to periodically and frictionally engage a portion of said member so as to apply thereto a series of momentary retarding forces, the momentum of said vibratory means cooperating with said resilient element to automatically cause said means to continue to vibrate for a substantial length of time after it has once been set into vibration.

References Cited in the file of this patent

UNITED STATES PATENTS

| | | |
|---|---|---|
| 468,108 | Hunt | Feb. 2, 1892 |
| 1,214,507 | Breitinger | Feb. 6, 1917 |
| 1,230,258 | Wood | June 19, 1917 |
| 2,368,002 | Cooper | Jan. 23, 1945 |